(12) United States Patent
Mazur et al.

(10) Patent No.: US 11,934,178 B1
(45) Date of Patent: Mar. 19, 2024

(54) SYSTEMS AND METHODS FOR DATA TRANSMISSION WITHIN AN INDUSTRIAL AUTOMATION SYSTEM

(71) Applicant: Rockwell Automation Technologies, Inc., Mayfield Heights, OH (US)

(72) Inventors: David C. Mazur, Mequon, WI (US); Rob A. Entzminger, Shawnee, KS (US); Jonathan A. Mills, Mayfield Heights, OH (US); Todd A. Wiese, Hubertus, WI (US); Bruce T. McCleave, Jr., Mission Viejo, CA (US); James M. Teal, New Brunswick, NJ (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 17/945,706

(22) Filed: Sep. 15, 2022

(51) Int. Cl.
*G05B 19/4155* (2006.01)
(52) U.S. Cl.
CPC ............ *G05B 19/4155* (2013.01); *G05B 2219/31368* (2013.01)
(58) Field of Classification Search
None
See application file for complete search history.

(56) References Cited

U.S. PATENT DOCUMENTS

| | | | |
|---|---|---|---|
| 6,414,455 B1 * | 7/2002 | Watson | H02P 27/06 417/18 |
| 2018/0110019 A1 * | 4/2018 | Ly | H04L 27/2692 |
| 2021/0064016 A1 * | 3/2021 | Manturana | G05B 23/0227 |
| 2021/0149376 A1 * | 5/2021 | Briant | G05B 19/41865 |
| 2021/0356949 A1 * | 11/2021 | Venne | G06Q 10/06 |
| 2022/0100175 A1 * | 3/2022 | Riju | G05B 19/4183 |

* cited by examiner

*Primary Examiner* — Mohammad Ali
*Assistant Examiner* — David Earl Ogg
(74) *Attorney, Agent, or Firm* — Fletcher Yoder, P.C.

(57) ABSTRACT

Techniques for data transmission within an industrial automation system include modeling or simulating, in accordance with a model, a plurality of devices performing one or more operations in an industrial automation system, determining, for a first operation of the one or more operations and from a plurality of categories, a category for the first operation, sending a request to the industrial automation system for data associated with the first operation at a time, wherein the data and time are determined based on the category of the first operation, receiving, from the industrial automation system, the requested data, and modifying the model based on the received data.

17 Claims, 6 Drawing Sheets

SYSTEMS AND METHODS FOR DATA TRANSMISSION WITHIN AN INDUSTRIAL AUTOMATION SYSTEM

BACKGROUND

The present disclosure generally relates to data transmission within industrial automation systems.

Components within an industrial automation system may collect data during performance of an industrial automation process. The collected data may be transmitted directly to a cloud computing device by the collecting component, or transmitted to one or more edge computing devices for transmission to the cloud computing device. Transmitting data within the industrial automation system may utilize bandwidth of an industrial automation component that would otherwise be used to perform its primary function within the industrial automation system (e.g., performing or controlling all or part of an industrial automation process) or otherwise put undue stress on the industrial automation component. Accordingly, improved techniques for managing data transmission within an industrial automation system are desired.

This section is intended to introduce the reader to aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, non-transitory computer-readable medium stores instructions that, when executed by processing circuitry of a cloud computing system, cause the processing circuitry to perform actions including modeling or simulating, in accordance with a model, a plurality of devices performing one or more operations in an industrial automation system, determining, for a first operation of the one or more operations and from a plurality of categories, a category for the first operation, sending a request to the industrial automation system for data associated with the first operation at a time, wherein the data and time are determined based on the category of the first operation, receiving, from the industrial automation system, the requested data, and modifying the model based on the received data.

In another embodiment, a method includes receiving first data associated with an industrial automation system, generating a model of an operation performed by one or more devices in the industrial automation system, determining, for the operation, a category for the operation, determining, for the operation, a data transmission time based on the determined category for the operation, sending a request to the industrial automation system for second data associated with the operation at the data transmission time, receiving, from the industrial automation system, the requested second data, and modifying the model based on the received second data.

In a further embodiment, a system includes a processor and a memory, accessible by the processor. The memory stores instructions that, when executed by the processor, cause the processor to receive first data associated with an industrial automation system, generate a model of an operation performed by one or more devices in the industrial automation system, determine, for the operation, a data transmission time based on one or more characteristics of the operation, send a request to the industrial automation system for second data associated with the operation at the data transmission time, receive, from the industrial automation system, the requested second data, and modify the model based on the received second data.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DRAWINGS

These and other features, aspects, and advantages of the present embodiments will become better understood when the following detailed description is read with reference to the accompanying drawings in which like characters represent like parts throughout the drawings, wherein.

DETAILED DESCRIPTION

Figure 1:
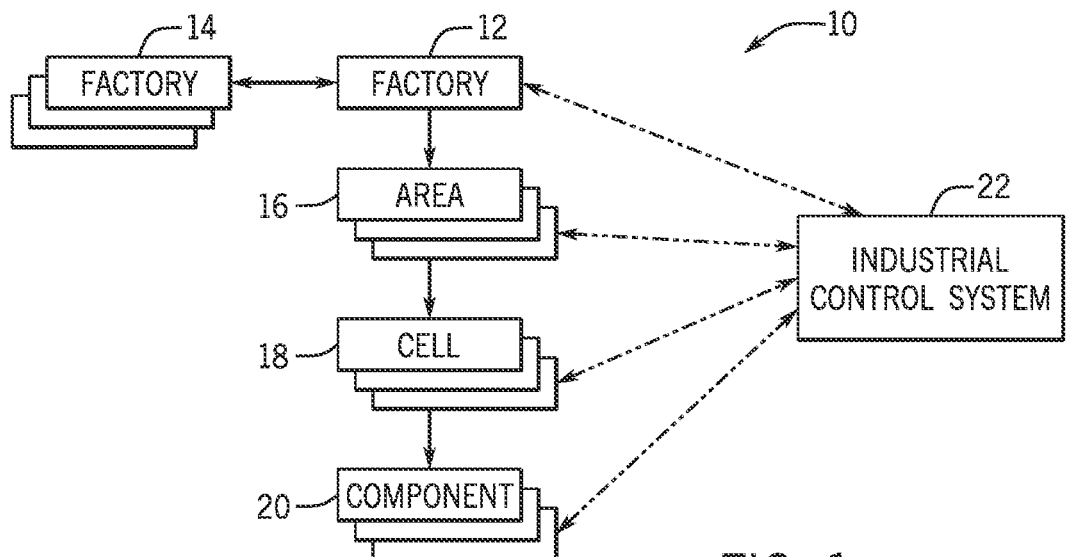
FIG. 1 illustrates a block diagram representing example hierarchical levels of an industrial automation system, in accordance with an embodiment presented herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

The present disclosure is directed to techniques for improving cloud-based data collection and management of industrial automation systems. Components within an industrial automation system may collect data during performance of an industrial automation process. The collected data may be transmitted directly to the cloud by the collecting component, or transmitted to one or more edge devices for transmission to the cloud. In some cases, the edge device may perform various functions, such as pre-processing, filtering, adding metadata, adding contextual data, compressing data, consolidating data, and so forth before transmitting the data to the cloud.

Transmitting data to the cloud, or to another component within the industrial automation system, such as an edge device, may utilize bandwidth of an industrial automation component that would otherwise be used to perform its primary function within the industrial automation system (e.g., performing or controlling all or part of an industrial automation process) or otherwise put undue stress on the industrial automation component. For example, off-premise network bandwidth may limit and/or constrain control loops meeting timing constraints of an industrial automation system in the upper levels of processing used to adjust operations. Bandwidth allocation may be better controlled locally to an edge device to provide sufficient system performance. Accordingly, it may be beneficial to schedule or sequence data transmission to be performed when the industrial automation component is not utilizing most or all of its bandwidth performing its primary function within the industrial automation system.

Operations performed by industrial automation components may be categorized and data transmission scheduled based upon the categorized operations so as not to interfere with operations, or to minimize the effect on operations. For example, components that perform constant speed or otherwise relatively steady state operations may have some flexibility as to when data is transmitted, such that data may be transmitted when performance of the operations is ongoing. Components that perform variable speed operations may be scheduled to transmit data when the operation is at a lull and the component has spare bandwidth to perform the data transmission. Components that perform cyclic or batch operations may be scheduled to transmit data between cycles or batches when the component has spare bandwidth to perform the data transmission. Further, frequency of data transmission may be adjusted based on various other factors. For example, data transmission may be less frequent when a component is early in its expected life span and more frequent as the component approaches the end of its expected life span or during anomalous behavior. Additionally, data transmission may be more frequent if an anomaly is detected, and then move back to less frequent data transmission once the anomaly has been investigated and/or resolved.

Once data has been transmitted to the cloud and analyzed, the cloud-based system may provide recommendations for the industrial automation system or provide a feedback input to automatically adjust settings of the industrial automation system to optimize operations of the industrial automation system. These recommendations may include, for example, adjustments to settings or operational parameters, what components should be replaced or serviced, when to perform the service or replacement, when to perform calibrations. In some cases, for more autonomous maintenance operations, such as calibrations, the cloud-based system may automatically perform these maintenance operations.

By way of introduction, FIG. 1 depicts a block diagram of an example of hierarchical levels that may represent an industrial automation system 10. The industrial automation system 10 may be any system in the material handling, packaging industries, manufacturing, processing, batch processing, or any technical field that employs the use of one or more industrial automation components. In one embodiment, the industrial automation system 10 may include a factory 12 that may encompass part of the entire industrial automation system 10. As such, the industrial automation system 10 may include additional factories 14 that may be employed with the factory 12 to perform an industrial automation process or the like.

Each factory 12 (or factory 14) may be divided into a number of areas 16, which may, for example, include different production processes that use different types of industrial automation components. In one example, one area 16 may include a sub-assembly production process and another area 16 may include a core production process. In another example, each area 16 may be related to a different operation being performed in the manufacturing process. For instance, in a jelly bean manufacturing system, the areas 16 may include a jelly bean making area, a packaging area, a water filtration area, and the like. In yet another example, the area may include a production line in which a particular industrial process may be performed. Referring back to the jelly bean manufacturing system example, the production line may include a cooking line in which the jelly beans may be created, a sorting line where the jelly beans may be sorted according to a respective flavor, and a packaging line where the sorted jelly beans may be packaged into boxes or the like.

The area 16 may also be associated with physical locations of a number of components 20 with respect to the industrial automation system 10. The areas 16 may also be related to different discipline areas of the industrial automation system 10, such as batch operation areas, continuous operation areas, discrete operation areas, inventory operation areas, and the like.

The areas 16 may be subdivided into smaller units, or cells 18, which may be further subdivided into components 20. Using the example described above, the sub-assembly production process area 16 may be subdivided into cells 18 that may denote a particular group of industrial automation components 20 that may be used to perform one aspect of the sub-assembly production process. As such, the cell 18 may include a portion of the area 16 such as first part of a production line. The cell 18 may also include different parts of a particular procedure.

These cells 18 may then be further subdivided into components 20, which may correspond to individual industrial automation components, such as controllers, input/output (I/O) modules, motor control centers, motors, human machine interfaces (HMIs), operator interfaces, contactors, starters, sensors, drives, relays, protection devices, switch-gear, compressors, network switches (e.g., Ethernet switches, modular-managed, fixed-managed, service-router, industrial, unmanaged, etc.) and the like. Although the factory 12, the factories 14, the areas 16, and the cells 18 are termed as factories, areas, and cells, it should be noted that in various industries these groupings may be referred to differently in different industries or the like. For instance, the groupings may be termed as units, areas, sites, and the like.

The components 20 may also be related to various industrial equipment such as mixers, machine conveyors, tanks, skids, specialized original equipment manufacturer machines, and the like. The components 20 may also be associated with devices used by the equipment such as scanners, gauges, valves, flow meters, and the like. In one embodiment, every aspect of the component 20 may be controlled or operated by a single controller (e.g., control system). In another embodiment, the control and operation of each aspect of the component 20 may be distributed via multiple controllers (e.g., control system).

The components 20 may be used within the corresponding cell 18, area 16, or factory 12 to perform various operations for the respective cell 18, area 16, or factory 12. In certain embodiments, the components 20 may be communicatively coupled to each other, to an industrial control system 22, or the like. Additionally, the industrial control system 22 may also be communicatively coupled to one or more control systems that may monitor and/or control the operations of each respective cell 18, area 16, or factory 12.

As such, the industrial control system 22 may be a computing device that may include communication abilities, processing abilities, and the like. For example, the industrial control system 22 may be a controller, such as a programmable logic controller (PLC), a programmable automation controller (PAC), or any other controller that may monitor, control, and operate an industrial automation device or component. The industrial control system 22 may be incorporated into any physical device (e.g., the industrial automation components 20) or may be implemented as a stand-alone computing device (e.g., general purpose computer), such as a desktop computer, a laptop computer, a tablet computer, a mobile device computing device, or the like.

In certain embodiments, the industrial control system 22 may be implemented within devices that enable industrial automation components 20 to connect and communicate with each other. For instance, the industrial control system 22 may be implemented within network routers and/or switches. In this manner, the network routers and/or switches may host the industrial control system 22 that may be used to control and operate the industrial control components 20 that may be communicatively coupled to the respective network router and/or switch. Since network routers and/or switches may serve as a hub for data transfers between the industrial automation components 20, the industrial control system 22 embedded along with the routers and/or switches may be strategically positioned within a data network to have access or receive data associated with various industrial automation components 20. As such, the industrial control system 22 may perform various types of analyses on the received data and may control and operate the respective industrial automation components 20 more efficiently or effectively based on the results of the analyses.

In addition to the physical devices mentioned above, the industrial control system 22 may include a software-based emulation of any of the aforementioned physical devices. For example, the industrial control system 22 may be implemented as software modules that may perform similar operations as certain hardware controllers, devices, and the like. As such, the industrial control system 22 may create virtual instances of the hardware components (e.g., controllers, I/O modules). These virtual instances may provide more flexible ways in which the industrial control system 22 may be implemented to monitor and control the industrial automation components 20.

In one embodiment, the industrial control system 22 may be implemented virtually in a cloud-accessible platform (i.e., cloud-computing system), one or more servers, in various computing devices (e.g., general purpose computers), and the like. As such, the industrial control system 22 may operate as a soft controller or as a control engine running in the cloud-computing system. By virtually implementing the industrial control system 22 in a cloud-computing system, the industrial control system may use a distributed computing architecture to perform various analyses and control operations. As more data associated with the industrial automation components 20, the cells 18, the areas 16, and the factories 14 become available, the distributed computing architecture in the cloud-computing system may enable data analysis to be performed more efficiently. That is, since the cloud-computing system may incorporate numerous computing systems and processors to perform the data analysis, the results of the analysis may be available more quickly. In this way, the respective operations of the industrial automation components the cells 18, the areas 16, and the factories 14 may be controlled in real-time or near real-time.

Keeping the foregoing in mind, it should be understood that the industrial control system 22, as mentioned throughout this disclosure, may be implemented as physical components and/or virtual components (i.e., software-based) used to monitor and/or operate the industrial automation components 20, the cells 18, the areas 16, and the factories 14. Moreover, by providing the ability to incorporate the industrial control system 22 into various types of environments, the industrial automation system 10 may be well suited to expand and grow with the addition of new industrial automation components 20.

Figure 2:
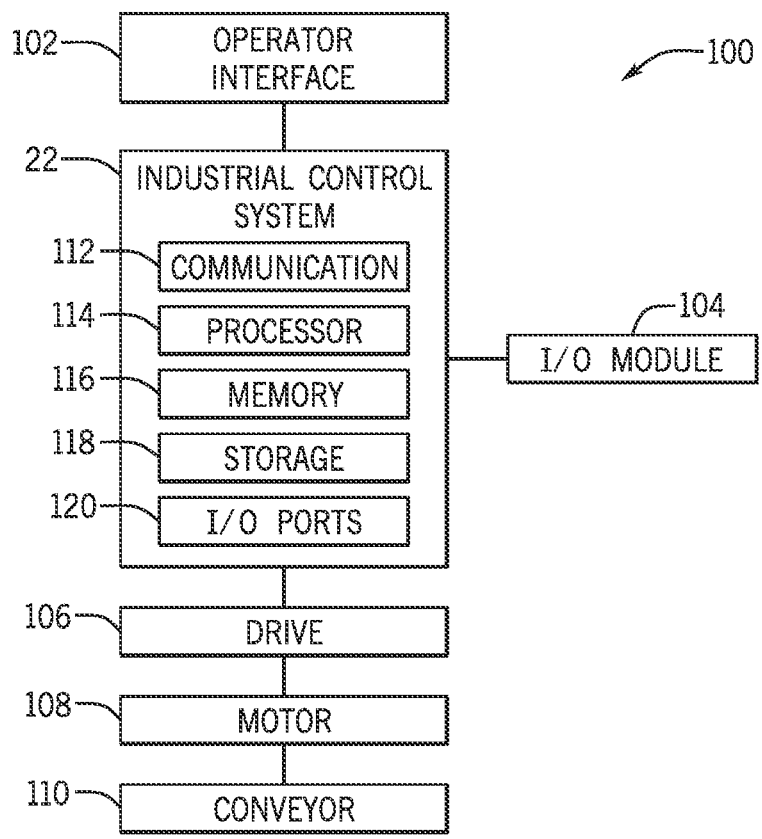
FIG. 2 illustrates a block diagram of an example control system that may be employed within the industrial automation system of FIG. 1, in accordance with an embodiment presented herein.

FIG. 2 illustrates an example control system 100 that may be employed with the industrial control system 22. As shown in FIG. 2, the industrial control system 22 may be communicatively coupled to an operator interface 102, which may be used to modify and/or view the settings and operations of the industrial control system 22. The operator interface 102 may be a user interface that may include a display and an input device used to communicate with the industrial control system 22. The display may be used to display various images generated by industrial control system 22, such as a graphical user interface (GUI) for operating the industrial control system 22. The display may be any suitable type of display, such as a liquid crystal display (LCD), plasma display, or an organic light emitting diode (OLED) display, for example. Additionally, in one embodiment, the display may be provided in conjunction with a touch-sensitive mechanism (e.g., a touch screen) that may function as part of a control interface for the industrial control system 22. In some embodiments, the operator interface 102 may be characterized as a human-machine interface, a human-interface machine, or the like.

The industrial control system 22 may also be communicatively coupled to input/output (I/O) modules 104. The I/O modules 104 may enable the industrial control system 22 to communicate with various devices in the industrial automation system. Moreover, the I/O modules 104 may enable the industrial control system 22 to receive information from the various devices, such that the information may provide reference points and other details regarding the industrial automation system to assist the industrial control system 22 to become aware of the environment in which the industrial control system 22 may be operating.

Generally, the industrial control system 22 may also be communicatively coupled to a certain device that may be used to control or manage the operation of the industrial automation system. For instance, in one embodiment, the industrial control system 22 may be coupled to a drive 106. The drive 106 may be an electrical drive that may convert an input alternating current (AC) voltage into a controllable AC voltage using a rectifier circuit and an inverter circuit. The industrial control system 22, in one embodiment, may be a controller that may control the operation of the drive 106. The drive 106 may be coupled to a motor 108, which may operate a component such as a conveyor 110 or the like. In one embodiment, the industrial control system 22 may be communicatively coupled to the operator interface 102, the I/O module 104, the drive 106, or the like via a communication network such as EtherNet/IP, ControlNet, DeviceNet, or any other industrial communication network protocol.

Keeping the example control system 100 in mind and referring to FIG. 1, the drive 106, the motor 108, and the conveyor 110 may each be considered to be a single component 20. However, the drive 106, the motor 108, and the conveyor 110 may also be considered to be a part of a particular cell 18, area 16, and factory 12. Accordingly, the industrial control system 22 may have the ability to adjust the operation of the component the cell 18, the area 16, and the factory 12. For example, by adjusting the operation of the drive 106, the industrial control system 22 may adjust the operation of the motor 108 and the conveyor 110. Consequently, the industrial control system 22 may adjust the operation of the cell 18, the area 16, and the factory 12 having the conveyor 110 as a component. By understanding how each component 20 may be related to the industrial automation system 10 with respect to each area 16, each cell 18, and each component 20, the industrial control system 22 may begin to become capable to manage the operations (e.g., production, energy usage, equipment lifecycle) of the industrial automation system more efficiently.

As mentioned above, the industrial control system 22 may be a controller or any computing device that may include communication abilities, processing abilities, and the like. For instance, as illustrated in FIG. 2, the industrial control system 22 may include a communication component 112, a processor 114, a memory 116, a storage 118, input/output (I/O) ports 120, and the like. The communication component 112 may be a wireless or wired communication component that may facilitate communication between the industrial automation components 20, the control systems for the factory 12, the area 16, the cell 18, and the like. The processor 114 may be any type of computer processor or microprocessor capable of executing computer-executable code. The processor 114 may also include multiple processors that may perform the operations described below. The memory 116 and the storage 118 may be any suitable articles of manufacture that can serve as media to store processor-executable code, data, or the like. These articles of manufacture may represent computer-readable media (i.e., any suitable form of memory or storage) that may store the processor-executable code used by the processor 114 to perform the presently disclosed techniques. The memory 116 and the storage 118 may also be used to store the data, analysis of the data, and the like. The memory 116 and the storage 118 may represent non-transitory computer-readable media (i.e., any suitable form of memory or storage) that may store the processor-executable code used by the processor 114 to perform various techniques described herein. It should be noted that non-transitory merely indicates that the media is tangible and not a signal.

The I/O ports 120 may be interfaces that may couple to the I/O modules 104 discussed above. Moreover, while the industrial control system 22 is illustrated as including the communication component 112, processor 114, memory 116, storage 118, and input/output (I/O) ports 120, it should be noted that the control system for the factory 12, the area 16, the cell 18, and the like may also include the same components to perform the various techniques described herein.

Keeping the foregoing in mind, the industrial control system 22 may use the communication component 112 to communicatively couple to one or more control systems. The industrial control system 22 may also monitor and/or control the operations of each respective component 20, cell 18, area 16, or factory 12. For example, the industrial control system 22 may receive data received from assets, controllers, and the like (e.g., the components 20) that may be located in the factory 12, the areas 16, or the cells 18. In one embodiment, the industrial control system 22 or a control system for each area 16, cell 18, or component 20 may receive information related to how the industrial automation system 10 may be subdivided, how each area 16, cell 18, and component 20 may interact with each other, which components 20 are part of each factory 12, area 16, or cell 18, or the like. For example, each area 16 may be related to a particular process of a manufacturing process. As such, the information received by the respective control system may detail which processes performed in certain areas 16 may depend on other processes being completed in other areas 16.

In certain embodiments, the respective control system may determine how each component 20 may relate to a respective cell 18 or area 16 based on data received from each respective component 20. For instance, a control system of a first component 20 may receive data from multiple other components 20, such as a motor for a conveyer belt and a compressor for some industrial automation device. Upon receiving the data from a second component 20 that corresponds to the motor for the conveyer belt, the control system of the first component 20 may determine that the second component 20 is associated with some cell 18, which may be part of some area 16, based on a speed in which the motor may be operating. That is, the control system of the first component 20 may refer to information, such as system design parameters for the industrial automation system 10, and determine where the motor is located by identifying a motor with operating parameters, as specified by the system design parameters, having a substantially similar speed as the received speed. In certain embodiments, the speed at which the motor may be operating may not be sufficient to identify a particular motor if other motors in the industrial automation system 10 are operating at the same speed. As such, the control system may identify a motor by monitoring a speed profile (i.e., speed curve over time) of each motor in the industrial automation system 10. Additional ways in which a control system may identify particular components 20 may include monitoring an operating mode (e.g., running/stopped/paused) of each component 20, examining network related information (e.g. IP addresses, MAC addresses, sub-net masks, or a combination of any of these, etc.) associated with each component 20, analyzing electronically identified device data (e.g., description catalog number and/or electronic key provided via Ethernet/IP or CIP-based protocols), monitoring operating temperatures of each component 20 if available (e.g., components 20 in certain cells 18 are exposed to more heat/cold than others cells 18), monitoring energy consumption data associated with each component (e.g., larger drives could be part of and used in certain cells 18 while smaller drives are used in other cells 18), and so forth.

In any case, after analyzing the data associated with each component 20, the control system of the first component 20 may determine its relationship with other components 20 of the industrial automation system with respect to the various scopes or hierarchical levels of the industrial automation system 10. By understanding the relationship to other components 20 with respect to various scopes of the industrial automation system 10, the control system of the first component 20 may become aware of conditions occurring in processes, areas 16, or cells 18 that may directly or indirectly affect the operations of the first component 20. As such, the control system of the first component 20 may adjust its operations and send commands to other components 20 to adjust their respective operations to compensate or minimize negative consequences that may occur due to the conditions in the areas 16, the cells 18, or the like. For example, production capacity of upstream or downstream cells being automatically adjusted by control systems in the respective cells by monitoring production levels of the cells adjacent to or related to the respective control system. As a result, the control systems may optimize production of the industrial automation system 10 by reducing the effects of bottleneck cells that may lead to over or under production. In another example, sections of a conveyor used to transport materials may start adjusting their respective speeds based on other sections of the conveyor or production variances associated with the area 16, the cells 18, or the entire factory 12. In yet another example, the control system of the first component 20 may take into account energy consumption data associated with a second component to adjust the operation of the first component 20 (e.g. go to a lower energy consumption mode to maintain overall consumption constant, etc.). Additionally, after each component 20 becomes aware of the presence or existence of another component 20, some of the components 20 may negotiate and determine an optimal production rates for each component 20 based on predetermined criteria such as energy consumption/rates, production mix, production levels, and the like.

Figure 3:
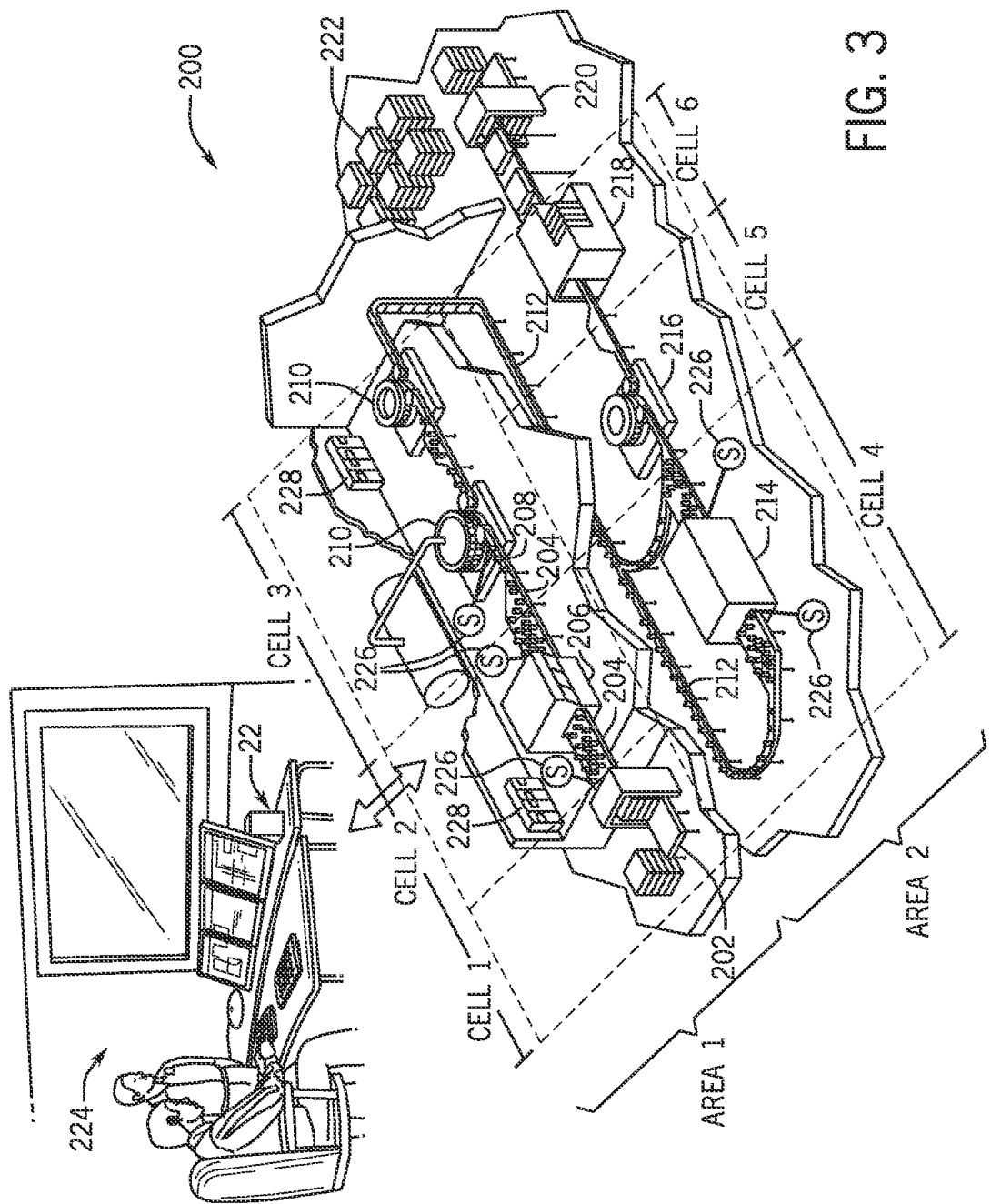
FIG. 3 illustrates an example of the industrial automation system of FIG. 1, in accordance with an embodiment presented herein.

Keeping the foregoing in mind, an example industrial automation system 10 of a packaging factory 200 and how the packaging factory 200 may be divided and subdivided into areas 16 and cells 18 are depicted in FIG. 3. As illustrated in FIG. 3, the packaging factory 200 may represent an exemplary high-speed packaging line that may be employed in the food and beverage industry that may process beverage containers (i.e., a beverage line). As such, the packaging factory 200 may include industrial automation components that, for example, may enable machine components to fill, label, package, or palletize containers. The packaging factory 200 may also include one or more conveyor sections that may transport, align, or buffer containers between the machine components. Although FIG. 3 illustrates a packaging factory, it should be noted that the embodiments described herein are not limited for use with a packaging factory. Instead, it should be understood that the embodiments described herein may be employed in any industrial automation environment.

As illustrated in FIG. 3, the packaging factory 200 may include machine components configured to conduct a particular function with respect to the beverage packaging process. For example, the beverage packaging process begins at a loading station 202, where pallets of empty cans or bottles to be filled are fed into packaging factory 200 via a conveyor section 204. The conveyor section 204 transports the empty cans from the loading station 202 to a washing station 206, where the empty cans and bottles are washed and prepared for filling. As the washed cans and bottles exit the washing station 206, the conveyor section 204 may gradually transition into an aligning conveyor section 208, such that the washed cans and bottles enter a filling and sealing station 210 in a single-file line.

The filling and sealing station 210 may function at an optimal rate when the washed cans and bottles enter the filling and sealing station 210 in a steady, uniform stream. However, if the transition between the conveyor section 204 and the aligning conveyor section 208 is erratic or faster than desired, the filling and sealing station 210 may not function at an optimal rate. As such, optimizing performance parameters (e.g., speed, size, function, position/arrangement, or quantity) of the conveyor sections (i.e., conveyor section 204 or aligning conveyor section 208) may be beneficial to the efficiency of the packaging factory 200.

As the sealed cans exit the filling and sealing station 210, a buffering conveyor section 212 may hold the sealed cans to delay their entry into the next station. In addition, the buffering conveyor section 212 may transport the sealed cans in a single-file line so that the sealed cans arrive at a sterilization station 214 or a labeling station 216 at a desired time with the desired quantity of cans. Similar to the filling and sealing station 210, the packaging station 218 or the labeling station 216 functions efficiently when the buffering conveyor section 212 operates at optimal performance parameters (e.g., optimal speed, size, function, position/arrangement, or quantity). After the cans and bottles have been sterilized and/or labeled, they are packaged into cases (e.g., 6-pack, 24-pack, etc.) at a packaging station 218, before they are palletized for transport at station 220 or stored in a warehouse 222. Clearly, for other applications, the particular system components, the conveyors and their function will be different and specially adapted to the application.

The packaging factory 200 may also include the industrial control system 22, which may be located in a control room 224 or the like. The industrial control system 22 may be coupled to one or more sensors 226, which may monitor various aspects of the machine components or conveyor sections of the packaging factory 200. The sensors 226 may include any type of sensor, such as a pressure sensor, an accelerometer, a heat sensor, a motion sensor, a voltage sensor, and the like. The sensors 226 may be located in various positions within the packaging factory 200 and may measure a parameter value of interest relating to the beverage packaging process during the operation of the packaging factory 200. For example, in certain embodiments, the sensors 226 may include sensors configured to measure the rate of bottles or containers per minute (BPM) entering or leaving a machine component (i.e., stations 204, 206, 208, 214, 216, 218 or 220), or the rate of accumulation of bottles on a portion of a conveyor section (e.g., conveyor section 204 or 212). In general, any sensors 226 capable of measuring a parameter value of interest relating to the beverage packaging process of the packaging factory 200 (e.g., rate, pressure, speed, accumulation, density, distance, position/arrangement, quantity, size, and so forth) may be used.

In some embodiments, the packaging factory 200 may include a number of industrial automation power components 228 that may be used to control power used by various machine components in the packaging factory 200. The power components 228 may include devices, such as drives, motors, inverters, switch gear, and the like, which may be used to operate a corresponding machine component. For example, the conveyor section 204 may rotate using a motor, which may be controlled via a power component 228, such as a variable frequency drive.

The power component 228 may include a control system that may monitor and control the operations of the respective power component 228. As such, the power component 228 may correspond to the component 20 described above with respect to FIG. 1. Referring back to the example above, the control system of the power component 228, such as the drive used to control the motor rotating the conveyor section 204, may monitor an operating frequency or feedback signal provided to the motor and may determine the speed at which the conveyor section 204 may be moving. In one embodiment, the control system of the power component 228 may send the data related to the speed at which the conveyor section 204 may be moving to the industrial control system 22 or to other control systems that may control other components 20. In this manner, the industrial control system 22 or other control systems may be aware of the operations of the power component 228 and may account for these operations when determining how its respective component should operate.

Keeping the packaging factory 200 of FIG. 3 in mind, the industrial control system 22 may receive data from multiple power components 228 dispersed throughout the packaging factory 200. The industrial control system 22 may then contextualize the received data with respect to different scopes or hierarchical levels as described above with reference to FIG. 1.

Figure 4:
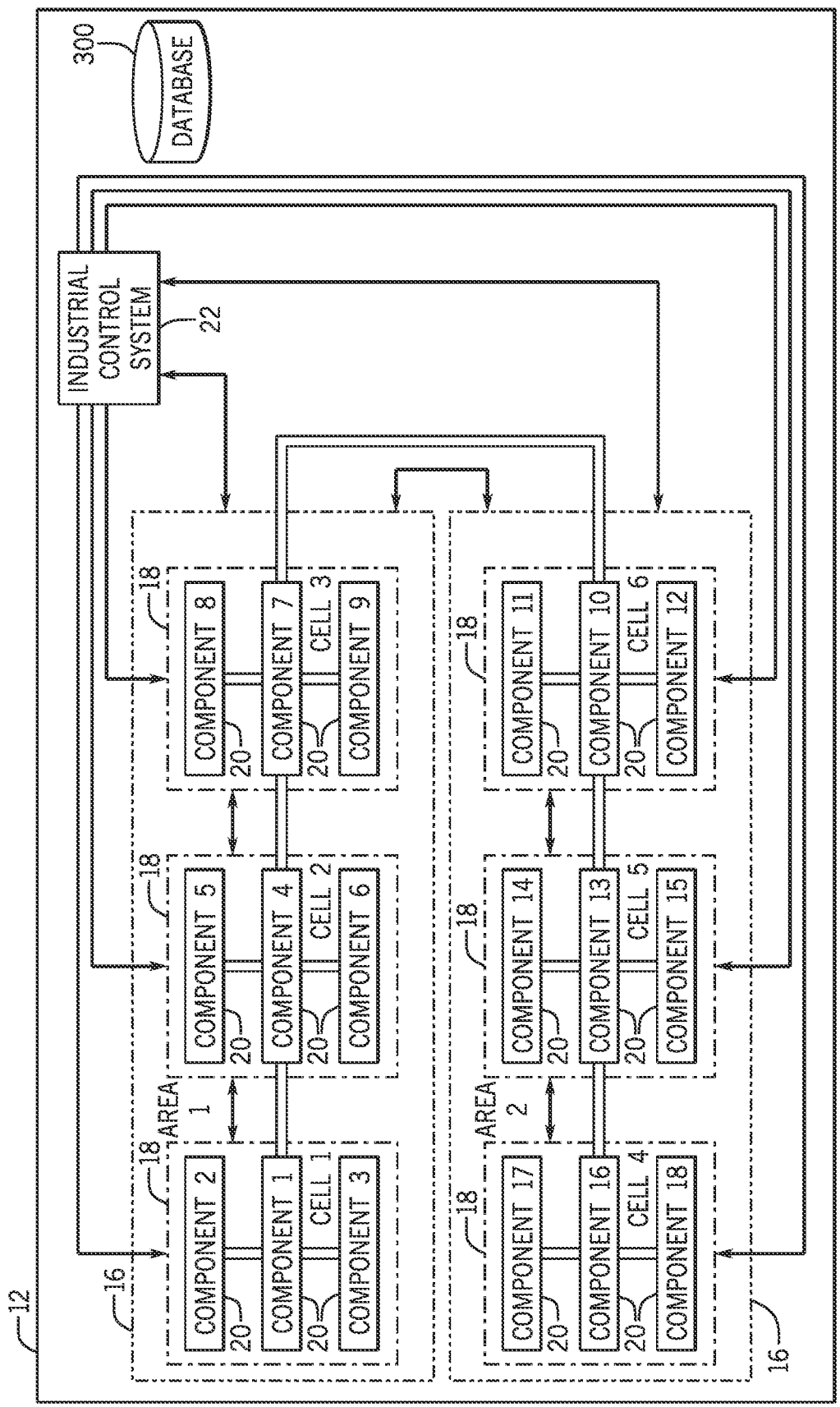
FIG. 4 illustrates a block diagram that depicts hierarchical levels of the example industrial automation system of FIG. 3, in accordance with an embodiment presented herein.

In one embodiment, the scopes of the packaging factory 200 may be categorized based on functions of the components 20 and the cells 18 of the packaging factory 200. For instance, referring to both FIGS. 3 and 4, the loading station 202 may be categorized as cell 1, the washing station 206 may be categorized as cell 2, the sealing station 210 may be categorized as cell 3, the sterilization station 214 may be categorized as cell 4, the labeling station may be categorized as cell 5 and the packaging station 218 may be categorized as cell 6. As shown in FIG. 4, each component 20 may correspond to a particular cell 18. That is, each component 20 that may be used by the respective station may be categorized as part of the respective cell 18.

In the same manner, the areas 16 may be categorized based on functions of the cells 18 of the packaging factory 200. For instance, cells 1-3 of the packaging factory 200 may correspond to a preparation process and cells 4-6 of the packaging factory 200 may correspond to a packaging process. As such, cells 1-3 may be categorized as area 1 and cells 4-6 may be categorized as area 2.

In one embodiment, the industrial control system 22 may determine the categories or scopes of the industrial automation system 10 based on a factory diagram or specification that describes the various processes employed by the industrial automation system 10 and the components 20 used for the respective processes. In another embodiment, each control system for each component 20 may include information indicating the function of the component 20, a location of the component 20 with respect to the industrial automation system 10, a part of a manufacturing process that the component 20 is associated with, or the like. Here, each respective control system of each respective component 20 may send this information to the industrial control system 22 or to other control systems of nearby components 20. The control system that receives the information may then determine how the component 20 that transmitted the information may relate to the various scopes of the industrial automation system 10, how the component that received the information may be related to the component 20 that transmitted the information with respect to the various scopes of the industrial automation system 10, and the like. In certain embodiments, each control system may send information related to the scopes of the industrial automation system 10, information detailing a relationship between each scope of the industrial automation system 10, information detailing a relationship between each component 20 in the industrial automation system with respect to each scope of the industrial automation system 10, and the like to a database 300, which may be accessible by each control system as a centralized database or a database distributed between a number of machines, computers, or the like.

Figure 5:
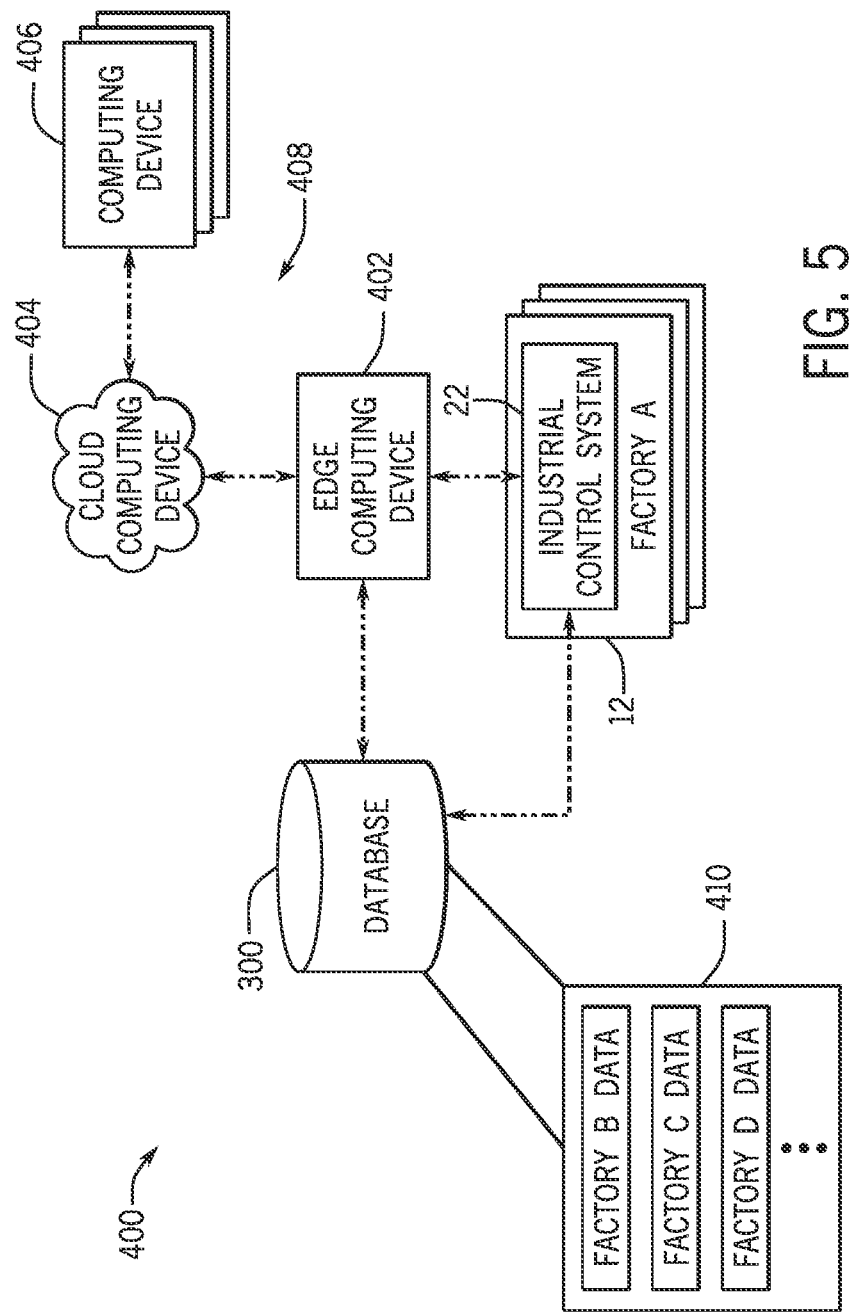
FIG. 5 illustrates a block diagram of a data analysis system, in accordance with an embodiment presented herein.

Additionally, the industrial control system 22 may communicate with other computing devices, such as computing devices not included in the factory 12 that may be controlled by other entities. For example, FIG. 5 depicts a data analysis system 400 that includes the factory 12 (which includes the industrial control system 22), the database 300, an edge computing device 402, a cloud computing device 404, and one or more other computing devices 406. The industrial control system 22 and database 300 may communicate with one another as discussed above. Moreover, the industrial control system 22 and database 300 may be communicatively coupled to the edge computing device 402, which may be a computing device such as a computer, server, router, routing switch, or integrated access device (IAD) that manages the flow of data into and out of a network, such as industrial automation network included in the factory 12 (e.g., a network utilized by the industrial control system 22 to communicate with the components of the industrial automation system 10 and the database 300). Accordingly, the edge computing device 402 may be included within the industrial automation system 10. Furthermore, while FIG. 5 includes a single edge computing device 402, in other embodiments, the data analysis system 400 may include more than one edge computing device 402.

The computing devices 406 may include computers, servers, or the like that are operated or managed by other entities. For example, the computing devices may be associated with other factories or an entity that provides one or more services for the factory 12 (or industrial automation system 10), such as data management, data analysis, security services, or diagnostic services (e.g., to determine or resolve potential errors associated with the industrial automation system 10 or the operation thereof). The computing devices 406 may communicate with the industrial automation system 10 (e.g., via the industrial control system 22) and database 300 via the cloud computing device 404 and the edge computing device 402 utilizing a common data pipeline that may be partially implemented via communication link 408. The communication link 408 may include communication infrastructure, such as a wired connection, wireless connection, or both that communicatively couples the edge computing device 402, the cloud computing device 404, and the computing devices 406 to one another. The common data pipeline generally refers to a communication infrastructure (e.g., the communication link 408) as well as one or more processes utilized to send, receive, and characterize data that is communicated using the communication infrastructure. As such, the techniques described herein may be implemented using already existing communication infrastructure (e.g., wired networks, wireless networks, or a combination thereof), thereby avoiding adding more communication infrastructure in potentially already crowded industrial environments.

The edge computing device 402, the cloud computing device 404, and the computing devices 406 may each include one or more processors that execute computer-readable instructions, such as instructions that may be stored in memory or a storage device that the edge computing device 402, the cloud computing device, and the computing devices 406 may also include. By executing such instructions, the one or more processors included in the edge computing device 402, the cloud computing device, and the computing devices 406 may communicate with one another via the common data pipeline. In other words, the edge computing device 402, the cloud computing device 404, and the computing devices 406 may include the communication component 112, processor 114, memory 116, storage 118, and input/output (I/O) ports 120 described above and utilize these components to enable communication via the common data pipeline. It should be noted that, in other embodiments, the data analysis system 400 may not include the cloud computing device 404. In such embodiments, the computing devices 406 may communicate with the industrial control system 22 and database 300 via just the edge computing device 402. Furthermore, in some embodiments, the cloud computing device 404 may be implemented in the form of a system that includes more than one computing device.

The industrial control system 22 and the database 300 may share various types of data with the computing devices 406 using the common data pipeline. Likewise, the computing devices 406 may communicate with the industrial control system 22 and the database 300 via the common data pipeline. For example, the industrial control system 22 and database 300 may share data regarding the factory 12 (and data 410 regarding factories 14 in the case of the database 300) or components thereof with the edge computing device 402, which may selectively communicate the data to the cloud computing device 404. For instance, as described in more detail below, the edge computing device 402 may group data received from the industrial automation system 10 (e.g., via industrial control system 22 or the database 300), apply metadata (e.g., data tags) to the received data, or both as part of a protocol before sending the data to the cloud computing device 404. By doing so, data associated with the factory 12 (or factories 14) may be characterized in a way that enables the cloud computing device 404 to determine which of the computing devices 406 to which to send the data. Moreover, characterizing the data enables the computing devices 406 and the cloud computing device 404 to interpret the data. For instance, as described above, the data associated with the factory 12 may pertain to a plethora of different devices that are made by different manufacturers and communicate using different protocols, such as FactoryTalk Live Data, EtherNet/IP, or other Common Industrial Protocol (CIP) based protocols, OPC Direct Access (e.g., machine to machine communication protocol for industrial automation developed by the OPC Foundation), or any suitable communication protocol (e.g. DNP3, Modbus, Profibus, LonWorks, DALI, BACnet, KNX, EnOcean). By characterizing the data, the computing devices 406 and the cloud computing device 404 can identify each particular portion of the data. This may enable the computing devices 406 and cloud computing device 404 to determine a layout of the factory 12, the automation devices included in the factory 12 (or factories 14), and what the various forms of received data are (e.g., power consumption data, log files, or other data associated with the factory 12 (or factories 14).

As previously described, components within the industrial automation system 10 may collect data during performance of operations that may be a part of an industrial automation process. Data may be transmitted to the cloud computing device 404 either directly or via one or more intermediate devices, such as the edge computing device 402. In some embodiments, the edge computing device 402 may perform various functions, such as pre-processing, filtering, adding metadata, adding contextual data, compressing data, consolidating data, and so forth, before transmitting the data to the cloud computing device 404. For components of the industrial automation system 10, and in some cases the edge computing devices 402, transmission of data within the data analysis system 400 may utilize bandwidth that would otherwise be used to perform its primary function within the industrial automation system (e.g., performing or controlling all or part of an industrial automation process), or otherwise put undue stress on the industrial automation component 20 or an edge computing device 402. For example, off-premise network bandwidth may limit and/or constrain control loops meeting timing constraints of an industrial automation system 10 in the upper levels of processing used to adjust operations. Bandwidth allocation may be better controlled locally to an edge computing device 402 to provide sufficient industrial automation system 10 performance. Accordingly, scheduling or sequencing data transmission to be performed when the industrial automation component is not utilizing most or all of its bandwidth performing its primary function within the industrial automation system may result in more efficient usage of bandwidth throughout the data analysis system 400.

Figure 6:
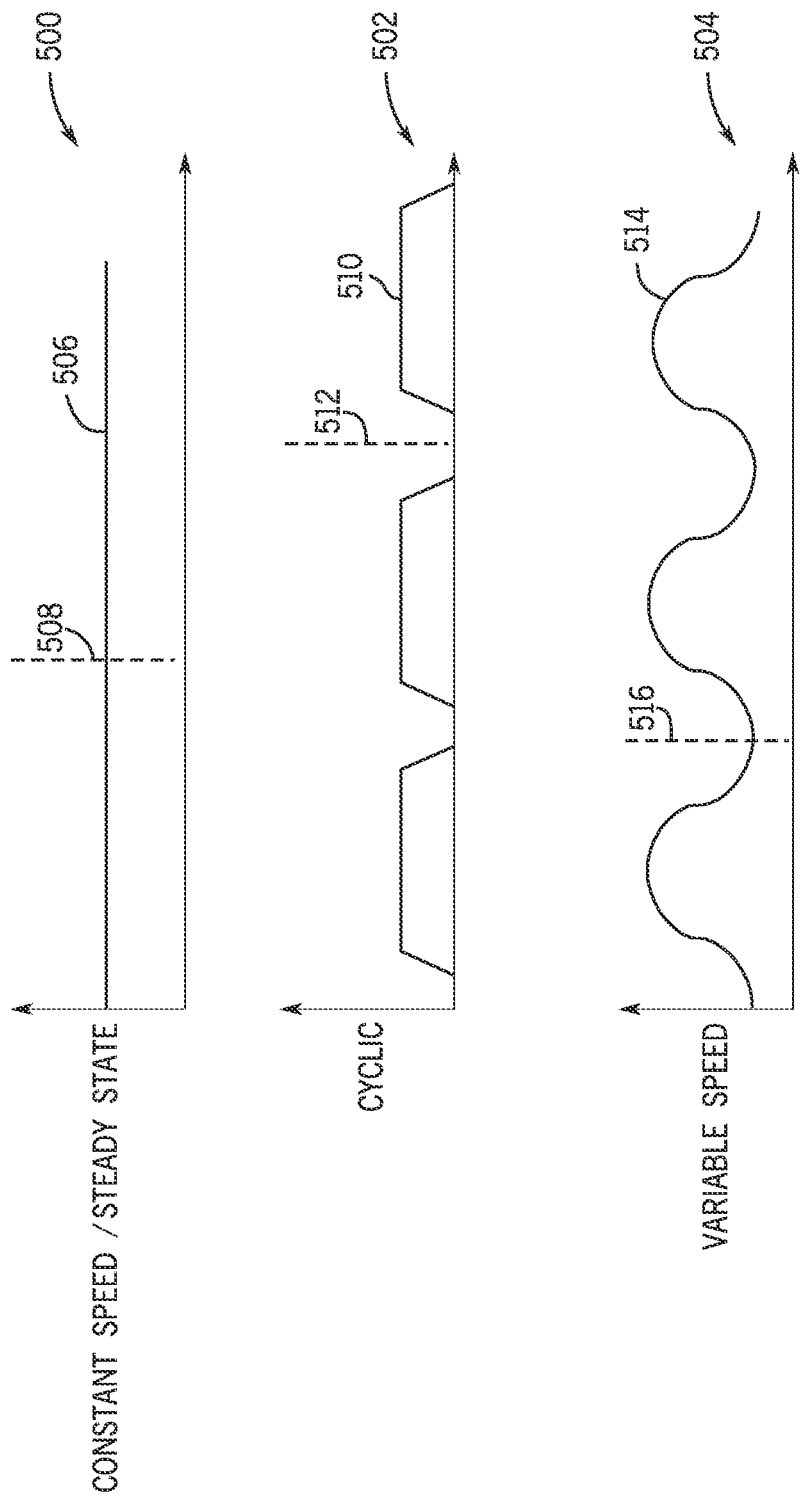
FIG. 6 illustrates example plots of actuator speed over time during constant speed, cyclic, and variable speed operations, in accordance with embodiments presented herein.

With this in mind, FIG. 6 illustrates example plots of actuator speed over time during constant speed 500, cyclic 502, and variable speed operations 504, respectively. In each of the plots, the vertical axis represents actuator speed and the horizontal axis represents time. Accordingly, in the constant speed plot 500, the actuator speed 506 plotted over time is a constant and/or steady state value. Accordingly, some flexibility exists as to when to set a data transmission time to a cloud computing device or an edge computing device. This is, because of the steady state nature of the operation being performed by the industrial automation component, there is not much, if any, advantage to be gained or lost by strategically scheduling the data transmission time 508 for a time when the industrial automation component is not busy using its bandwidth to perform a task. As such, data transmission during constant speed or otherwise steady state operations may be synchronous (e.g., scheduled) and/or asynchronous (e.g., not scheduled, data is transmitted as collected or as the collecting device is able to transmit the data).

Plot 502 is a plot of actuator speed 510 over time for a cyclic or batch operation. As shown, the actuator speed 510 follows cycles. In the illustrated embodiment, the actuator speed 510 ramps up, reaches steady state, ramps down, and pauses for a period of time before starting a new cycling and ramping back up. However, it should be understood that embodiments in which plot 502 of actuator speed follows other repeating patterns (e.g., step functions, sine waves, cyclic polynomial, and so forth) are also envisaged. In such embodiments, setting transmission time 512 at a time when the industrial automation component is not utilizing its peak bandwidth during the cycle may help to conserve bandwidth during the operation. For example, in the plot 502 of the cyclic operation shown in FIG. 6, transmission time is scheduled between cycles when the actuator speed 510 is zero or near zero, or when network control bandwidth utilization is below a threshold value, in a relative lull, at a low point over a given time period, etc. However, in other embodiments, the transmission time 512 may be set when the actuator speed 510 is at a lull or decreasing, indicating that the industrial automation component may have some spare bandwidth to transmit collected data. For example, the industrial automation component may use the most bandwidth of the cycle when the actuator speed 510 is ramping up (e.g., accelerating), or at its peak speed. Accordingly, setting the transmission time 512 at a time when the actuator speed 510 is not ramping (e.g., accelerating) up may help to ensure that the industrial automation component has enough excess bandwidth to transmit data without affecting the industrial automation component's ability to perform its part of the industrial automation process. Accordingly, for cyclic operations, the industrial automation component may be configured to transmit synchronous (e.g., scheduled) data collected across the whole cycle at the end of the cycle.

Similarly, plot 504 is a plot of actuator speed 514 over time for a variable speed operation. As shown, the actuator speed 514 varies over time, ramping up, peaking, ramping down, lulling, ramping back up, and so on through time. It should be understood, however, that other embodiments are envisaged in which plot 504 of actuator speed 514 follows other patterns over time, (e.g., gradually increasing, gradually decreasing, step functions, sine waves, cyclic polynomial, random, and so forth). In such embodiments, setting transmission time 516 at a time when the industrial automation component is not utilizing its peak bandwidth during operation may help to conserve bandwidth during the operation. For example, in the plot 504 of the variable operation shown in FIG. 6, transmission time is scheduled when the actuator speed 514 is in a lull, indicating that the industrial automation component may have some spare bandwidth to transmit collected data. For example, the industrial automation component may using the most bandwidth of the cycle when the actuator speed 514 is peaking or increasing. Accordingly, setting the transmission time 516 at a time when the actuator speed 514 is not peaking or increasing may help to ensure that the industrial automation component has enough excess bandwidth to transmit data without affecting the industrial automation component's ability to perform its part of the industrial automation process. As such, data transmission during variable speed operations may be synchronous (e.g., scheduled) and/or asynchronous (e.g., not scheduled, data is transmitted as collected or as the collecting device is able to transmit the data).

Though the plots 500, 502, 504 of FIG. 6 are indicative of motor speed, it should be understood that motor speed is being used as a proxy for how much of an industrial automation component's bandwidth is being utilized to perform an operation. As such, rather than using actuator speed, other embodiments are envisaged that use other parameters, such as processor utilization, energy usage/output, temperature, displacement acceleration, flow rate, and so forth. Similarly, it should be understood that the disclosed techniques may be used to schedule data transmission based on other factors, such as expected lifespan, amount of expected lifespan remaining, anomaly detection, and anomaly being unresolved, specific conditions being present or not present, and so forth.

Figure 7:
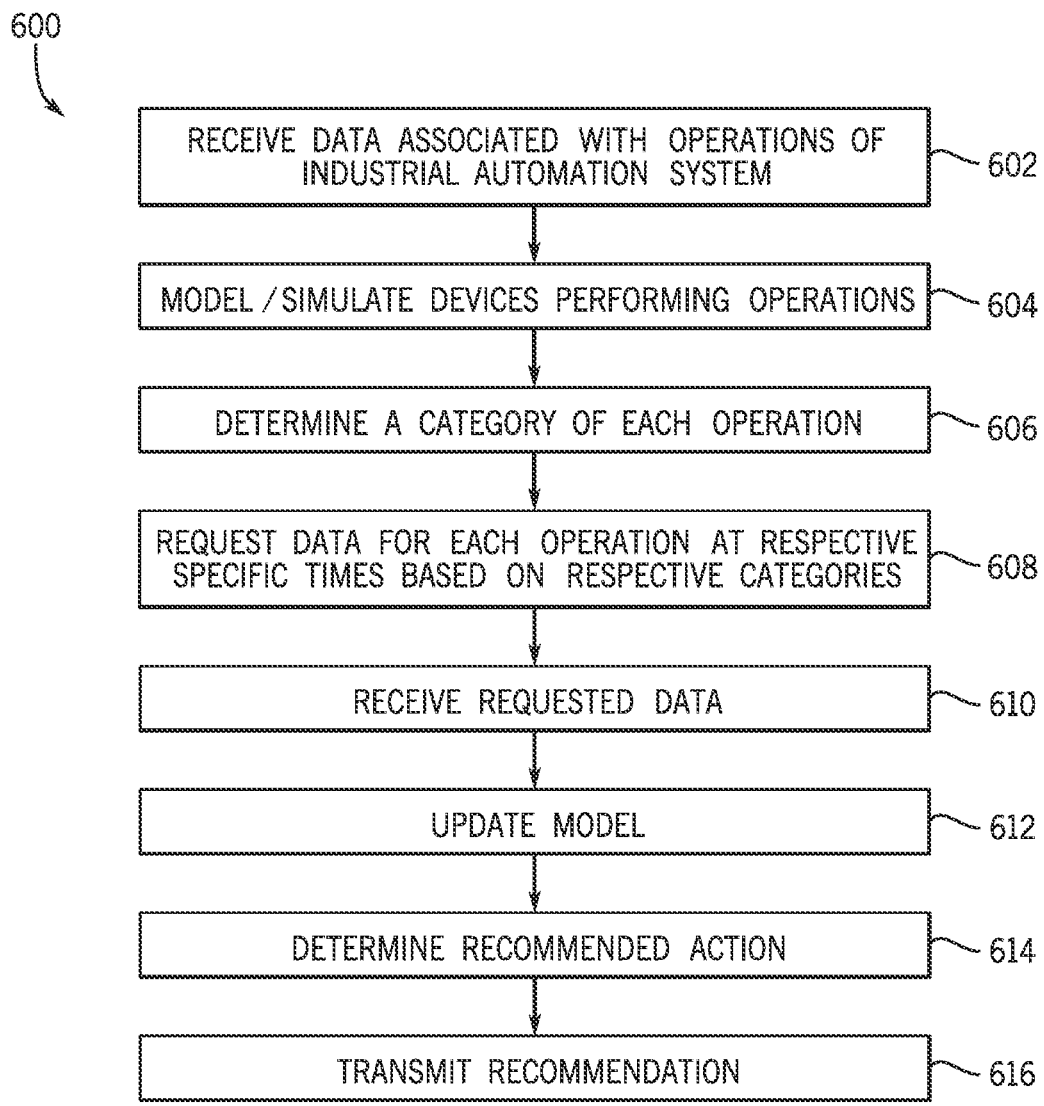
FIG. 7 is a flow chart of a process for scheduling data transmission for an industrial automation system, in accordance with embodiments presented herein.

FIG. 7 is a flow chart of a process 600 for scheduling data transmission for an industrial automation system. At block 602, data associated with operations of the industrial automation system is received. The data may include, for example, design elements, a design file, a project file, information about characteristics of the various components of the industrial automation system, information about how the various components of the industrial automation system are configured, information about how the various components of the industrial automation system work in concert to perform one or more industrial automation processes, operational data, desired results of the one or more industrial automation processes, acceptable values or ranges for various parameters of the industrial automation system or the one or more industrial automation processes, and so forth. At block 604, performance of the one or more industrial automation processes as performed by the industrial automation system is modeled (e.g., a model is generated and/or updated) and/or simulated using a model.

At block 606, operations performed by various components of the industrial automation system during the one or more industrial automation processes are categorized. As discussed above with respect to FIG. 6, categories may include, for example, constant speed, steady state, cyclical, batch, variable speed, and so forth. However, it should be understood that other categories of operations are also envisaged. Based on the assigned categories of the operations, as well as the start times and/or cycle lengths, recommended data transmission times may be determined for each operation. In some embodiments, when determining a data transmission time for a particular operation, data transmission times for other operations may be considered. For example, data transmission times for cyclical or variable speed operations, for which the windows of data transmission times may be small, and/or the advantages of strategically scheduling data transmission are significant, may be set first. Then, data transmission times for constant speed or steady state operations, for which the windows of data transmission times may be large, and/or the advantages of strategically scheduling data transmission are smaller, may be set second. In some embodiments, data from some operations (e.g., constant speed operations, steady state operations, variable speed operations, etc.) may be received asynchronously as it is collected or as the collecting device is able to transmit the data.

In some embodiments, data transmission times may be set and/or adjusted based on other factors. For example, data transmission may be less frequent when a component is early in its expected life span or maintenance/service cycle, and more frequent as the component approaches the end of its expected life span or maintenance/service cycle. Similarly, data transmission may be less frequent if a component was just serviced and more frequent as the component approaches its next anticipated service. Additionally, data transmission may be more frequent if an anomaly is detected, or some other condition is present, and then made less frequent once the anomaly has been investigated and/or resolved.

Further, data transmission times for the whole industrial automation system, cell, area, factory, etc. may be staggered, such that large amounts of data are not scheduled to be transmitted at the same time, thus overloading the network with traffic. In some embodiments, data transmission times may be automatically set, whereas in other embodiments, proposed data transmission times may be transmitted to a user for approval and/or editing. Once data transmission times have been set, either automatically or manually, a user may choose to customize or otherwise adjust set transmission times.

In some embodiments, the templates may be provided to customers and customized to specify what sorts of data are to be transmitted, default categories for the data, and suggested times and/or frequencies of data transmission. The templates may be customizable and/or otherwise adaptable such that customers can customize existing templates to fit the customer's schemas or other parameters/constraints. Additionally, as more data becomes available, more features may be added to the templates.

At block 608, requests are transmitted to components of the industrial automation and/or edge computing devices within the system for data associated with specific operations to be transmitted at the set data transmission times based on the categories assigned to the specific operations and/or other aspects of the industrial automation system. At block 610, the requested data is received from the industrial automation component, or from an intermediary device, such as an edge device. In some embodiments, intermediary devices may perform various functions as they receive data and relay it to the cloud computing device or another edge computing device. These functions may include, for example, pre-processing, filtering, adding metadata, adding contextual data, compressing data, consolidating data, and so forth.

At block 612, the model and/or simulation is updated based on the received data. In some embodiments, data transmission times may be adjusted based on the received data. For example, bandwidth within the system could be better conserved by adjusting data transmission times for one or more categorized operations. Further, if an anomaly or condition is detected, the frequency of data transmission may be adjusted for one or more related components. Similarly, frequency of data transmission may be adjusted based on where a component or part is in its expected lifespan and/or service window.

At block 614, one or more recommended actions, if any, may be determined. Recommendations may include, for example, replacing a part, performing service/maintenance, adjusting operational parameters, using different product/material, and so forth. For example, the estimated lifespan may be determined for a particular part, component, and/or device. If the estimated lifespan determined for the part, component, and/or device is below a threshold value, or the part, component, and/or device is determined to be wearing faster than expected, the recommendation may be to perform a preventative or corrective maintenance operation. This may include, for example, replacing a part, having the part, component, and/or device serviced, and so forth. In some embodiments, the recommendation may include an adjustment to operating parameters (e.g., to increase the lifespan of the part, component, and/or device), or a recommendation for specific replacement parts to increase the lifespan of the part, component, and/or device (e.g., replace with a higher durometer part at next service).

At block 616, the recommendation is transmitted for approval/implementation. In some embodiments, the recommendation may assist the user in performing the recommendation actions (e.g., provide a hyperlink to order replacement parts, provide a hyperlink to schedule service, provide a hyperlink to instructions and/or a video for performing a task, such as a maintenance operation, automatically adjust operational parameters upon approval, etc.). In some embodiments, the system may automatically take action on one or more of the recommendations. For example, the system may automatically schedule service/maintenance, order replacement parts, adjust parameters, etc. if the recommendations meet certain conditions. However, other recommendations may require human approval before implementation. For example, substantial changes to operating parameters, maintenance operations that require the industrial automation to be taken offline, etc. may be presented to a human for authorization.

The present disclosure is directed to techniques for improving cloud-based data collection and management of industrial automation systems. Components within an industrial automation system may collect data during performance of an industrial automation process. The collected data may be transmitted directly to the cloud by the collecting component, or transmitted to an edge device for transmission to the cloud. In some cases, the edge device may perform various functions, such as pre-processing, filtering, adding metadata, adding contextual data, compressing data, consolidating data, and so forth before transmitting the data to the cloud.

Transmitting data to the cloud, or to another component within the industrial automation system, such as an edge device, may utilize bandwidth of an industrial automation component that would otherwise be used to perform its primary function within the industrial automation system (e.g., performing or controlling all or part of an industrial automation process) or otherwise put undue stress on the industrial automation component. For example, off-premise network bandwidth may limit and/or constrain control loops meeting timing constraints of an industrial automation system in the upper levels of processing used to adjust operations. Bandwidth allocation may be better controlled locally to an edge device to provide sufficient system performance. Accordingly, it may be beneficial to schedule or sequence data transmission to be performed when the industrial automation component is not utilizing most or all of its bandwidth performing its primary function within the industrial automation system.

Operations performed by industrial automation components may be categorized and data transmission scheduled based upon the categorized operations so as not to interfere with operations, or to minimize the effect on operations. For example, components that perform constant speed or otherwise relatively steady state operations may have some flexibility as to when data is transmitted, such that data may be transmitted when performance of the operations is ongoing. Components that perform variable speed operations may be scheduled to transmit data when the operation is at a lull and the component has spare bandwidth to perform the data transmission. Components that perform cyclic or batch operations may be scheduled to transmit data between cycles or batches when the component has spare bandwidth to perform the data transmission (e.g., when network control bandwidth utilization is below a threshold value, in a relative lull, at a low point over a given time period, etc.). Further, frequency of data transmission may be adjusted based on various other factors. For example, data transmission may be less frequent when a component is early in its expected life span and more frequent as the component approaches the end of its expected life span. Additionally, data transmission may be more frequent if an anomaly is detected, and then move back to less frequent data transmission once the anomaly has been investigated and/or resolved.

Once data has been transmitted to the cloud and analyzed, the cloud-based system may provide recommendations for the industrial automation system or provide a feedback input to automatically adjust settings of the industrial automation system to optimize operations of the industrial automation system. These recommendations may include, for example, adjustments to settings or operational parameters, what components should be replaced or serviced, when to perform the service or replacement, when to perform calibrations. In some cases, for more autonomous maintenance operations, such as calibrations, the cloud-based system may automatically perform these maintenance operations.

Technical effects of the present techniques include more efficient use of component bandwidth within the industrial automation system such that components are not asked to transmit data within the industrial automation system when the components are utilizing their bandwidth to perform, control, or manage operations within the industrial automation system. Further, spacing out data transmission among different devices in the industrial automation system reduces or eliminates instances of the network being overloaded with traffic from multiple devices attempting to transmit large datasets at the same time.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A non-transitory computer-readable medium storing instructions that, when executed by processing circuitry of a cloud computing system, cause the processing circuitry to perform actions comprising:
   modeling or simulating, in accordance with a model, a plurality of devices performing one or more operations in an industrial automation system;
   determining, for a first operation of the one or more operations and from a plurality of categories, that a category for the first operation comprises a cyclic operations category;
   sending a request to the industrial automation system for data associated with the first operation at a time, wherein the data and time are determined based on the category of the first operation, and wherein the time occurs between cycles of the first operation;
   receiving, from the industrial automation system, the requested data; and
   modifying the model based on the received data.

2. The non-transitory computer-readable medium of claim 1, wherein the actions comprise:
   determining an estimated lifespan of a part included in a device of the plurality of devices;
   after receiving the requested data, determining a modified lifespan for the part by modifying the estimated lifespan based on the data; and
   in response to the modified lifespan being less than a threshold:
      determining a maintenance operation for the part; and
      sending, to the industrial automation system, a recommendation that includes the determined maintenance operation.

3. The non-transitory computer-readable medium of claim 1, wherein the plurality of categories comprises constant speed operations, variable speed operations, or a combination thereof.

4. The non-transitory computer-readable medium of claim 3, wherein the request for data comprises a request for a first set of synchronous data collected during a cycle of the first operation.

5. The non-transitory computer-readable medium of claim 1, wherein the actions comprise:
   changing the time to an updated time based on the received requested data; and
   sending an additional request to the industrial automation system for additional data associated with the first operation at the updated time.

6. The non-transitory computer-readable medium of claim 5, wherein the updated time is determined based on a part included in a device of the plurality of devices nearing an end of a lifespan or maintenance cycle.

7. The non-transitory computer-readable medium of claim 5, wherein the updated time is determined based on an anomaly being detected in the received requested data.

8. The non-transitory computer-readable medium of claim 1, wherein the actions comprise:
   determining a change to one or more operational parameters of the industrial automation system based on an analysis of the received requested data; and
   sending a recommendation to implement the change to the one or more operational parameters of the industrial automation system.

9. The non-transitory computer-readable medium of claim 1, wherein the actions comprise:
   determining a change to one or more operational parameters of the industrial automation system based on an analysis of the received requested data; and
   automatically implementing the change to the one or more operational parameters of the industrial automation system.

10. A method, comprising:
   receiving first data associated with an industrial automation system;
   generating a model of an operation performed by one or more devices in the industrial automation system;
   determining, for the operation, that a category for the operation comprises a constant speed operations category;
   determining, for the operation, a data transmission time based on the determined category for the operation;
   sending a request to the industrial automation system for second data associated with the operation at the data transmission time, wherein the request comprises a request for a set of synchronous or asynchronous data;
   receiving, from the industrial automation system, the requested second data; and
   modifying the model based on the received second data.

11. The method of claim 10, wherein the request is sent to, and the second data is received from, an edge computing device of the industrial automation system.

12. The method of claim 10, wherein the request is sent to, and the second data is received from, one of the one or more devices in the industrial automation system.

13. The method of claim 10, comprising:
   changing the data transmission time to an updated data transmission time based on the received requested second data; and sending an additional request to the industrial automation system for third data associated with the operation at the updated data transmission time.

14. The method of claim 10, wherein the category is one of a plurality of categories comprising a variable speed operations category, a cyclic operations category, or a combination thereof.

15. A system, comprising:
a processor; and
a memory, accessible by the processor, and storing instructions that, when executed by the processor, cause the processor to perform actions comprising:
receiving first data associated with an industrial automation system;
generating a model of an operation performed by one or more devices in the industrial automation system;
determining, for the operation, a data transmission time based on a category for the operation, wherein the category for the operation comprises a variable speed operations category;
sending a request to the industrial automation system for second data associated with the operation at the data transmission time, wherein the request for data comprises a request for a set of synchronous data collected during the operation;
receiving, from the industrial automation system, the requested second data; and
modifying the model based on the received second data.

16. The system of claim 15, wherein the category for the operation is one of a plurality of categories comprising a constant speed operations category, a cyclic operations category, or a combination thereof.

17. The system of claim 15, wherein the actions comprise:
determining a maintenance operation for the industrial automation system; and
sending, to the industrial automation system, a recommendation that includes the determined maintenance operation.

\* \* \* \* \*